(12) United States Patent
MacPhail

(10) Patent No.: US 6,661,434 B1
(45) Date of Patent: *Dec. 9, 2003

(54) METHOD AND SYSTEM FOR DISPLAYING STATUS OF CRITICAL INDICATORS ON DIVERSE DISPLAY DEVICES

(75) Inventor: Margaret Gardner MacPhail, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/548,696

(22) Filed: Apr. 13, 2000

(51) Int. Cl.$^7$ ................................................. G09G 5/00
(52) U.S. Cl. ...................................... 345/772; 345/846
(58) Field of Search ............................ 345/440, 440.2, 345/736, 764, 771, 772, 835, 837, 846, 977; 700/27; 710/15, 17, 18, 19

(56) References Cited

U.S. PATENT DOCUMENTS

| | | | |
|---|---|---|---|
| 4,858,152 A | | 8/1989 | Estes .......................... 702/186 |
| 5,333,256 A | * | 7/1994 | Green et al. ................. 345/772 |
| 5,369,589 A | * | 11/1994 | Steiner ........................ 340/990 |
| 5,375,199 A | * | 12/1994 | Harrow et al. ............... 345/771 |
| 5,483,631 A | | 1/1996 | Nagai et al. ................. 345/736 |
| 5,610,813 A | * | 3/1997 | Greenewald et al. .......... 702/5 |
| 5,680,560 A | * | 10/1997 | Gaertner ...................... 345/440 |
| 5,768,552 A | | 6/1998 | Jacoby ........................ 345/441 |
| 5,819,028 A | * | 10/1998 | Manghirmalani et al. ... 345/440 |
| 5,909,217 A | * | 6/1999 | Bereiter ....................... 345/772 |
| 5,953,010 A | * | 9/1999 | Kampe et al. .............. 345/772 |
| 6,421,700 B1 | * | 7/2002 | Holmes et al. ............. 345/772 |

* cited by examiner

Primary Examiner—John Cabeca
Assistant Examiner—Brian Detwiler
(74) Attorney, Agent, or Firm—Kevin L. Daffer; Conley Rose P.C.; Leslie Van Leeuwen

(57) ABSTRACT

In a system and method for displaying status of critical indicators or variables, icons representing the indicators are displayed in superposition with a reference shape. The reference shape is divided into "higher-interest" and "lower-interest" portions, such that display of an icon over the higher-interest portion of the reference shape indicates a higher-interest value of the corresponding variable. The reference shape is preferably elongated horizontally, with its upper portion designated as the higher-interest portion and its lower portion designated the lower-interest portion. Each monitored variable may be allocated a vertical "slice" of the reference shape, such that the position of the corresponding icon when the variable is in the higher-interest state is laterally aligned with the position of the icon when the variable is in the lower-interest state. In some embodiments, a single icon representing the present status of the corresponding variable is positioned over either the higher-interest or lower-interest portion of the reference shape. Alternatively, two icons may be used for each variable, where one is positioned over the higher-interest portion and the other over the lower-interest portion. This representation is believed to make the status of each monitored variable visible at a glance. The simplicity of the representation may allow it to be used effectively on various computational devices, including those with small, monochrome displays.

28 Claims, 6 Drawing Sheets

(a)

(b)

(c)

(a)

(b)

(c)

METHOD AND SYSTEM FOR DISPLAYING STATUS OF CRITICAL INDICATORS ON DIVERSE DISPLAY DEVICES

This application is related to the following copending U.S. Patent Applications, filed on even date herewith: Ser. No. 09/548,694 entitled "Method and System for Displaying Status of Critical Indicators on Diverse Display Devices and Indicating Changes in Status" by MacPhail, and Ser. No. 09/548,695 entitled "Method and System for Displaying Status of Critical Indicators on Diverse Display Devices and Indicating a History of Status Changes" by MacPhail.

BACKGROUND OF THE INVENTION

1. Field of the Invention

This invention relates to information display, and more particularly to a method and system for displaying the status of variables, or indicators, on diverse display devices. This method may be useful for multiple applications involving information display, including, for example, platform management in heterogeneous systems.

2. Description of the Related Art

The following descriptions and examples are not admitted to be prior art by virtue of their inclusion within this section.

The continuing proliferation of powerful, convenient computational devices has been accompanied by an increase in the use of networks connecting these devices. Computational devices include computers and other, often portable, devices such as wireless telephones, personal digital assistants (PDA's), automobile-based computers and appliance-based computers. Such computational devices are also sometimes termed "pervasive devices". "Computer", as used herein, may refer to any of such computational devices. The networks connecting computational devices may be "wired" networks, formed using "land lines" such as copper wire or fiber optic cable, wireless networks employing earth and/or satellite-based wireless transmission links, or combinations of wired and wireless network portions. Networked computational devices are increasingly configured with the ability to interact and communicate with one another. For example, electronic mail may currently be sent to some wireless telephones and pagers, and PDA's may be used to access some Internet and World Wide Web (or "web") sites.

Many network-based applications involve monitoring variables of interest, which may be called "critical indicators". For example, a system administrator for a computer system or network may need to monitor variables such as transaction rates, application program status, and disk space availability. Such variables may be considered critical indicators in that they are important indicators of the health of the system or network. Alternatively, an investor may wish to monitor a variable such as a stock price, and may particularly want to be alerted if the price rises above or falls below a particular critical value. Entertainment-oriented applications may also involve monitoring of critical indicators. For example, a horse-racing enthusiast may wish to know whether a particular race has started or finished, and/or whether a particular horse has placed above or below a particular level. Monitoring of such critical indicators using a computational device is typically done through a graphical user interface (GUI) on the device's display screen. Many different display formats are possible. For example, a bar graph could be used to indicate values of various indicators, where the heights of the bars vary with time to follow the indicator values. Icons representing each indicator may also be displayed on a screen, where selection of an icon by a user results in a text display containing information regarding the status of the indicator. To indicate when a variable has crossed a threshold value, various methods may be used, such as changing the shape or color of an icon representing the variable, or not displaying an icon unless the corresponding variable has crossed a threshold value.

The above-described methods of monitoring critical indicators may result in difficulties, however, for users of diverse computational devices having varying display screen capabilities. The trend in size and capability of such display screens often depends upon whether the device is fixed or portable. For example, displays associated with desktop computers are generally getting larger, to provide ease of viewing and/or accommodate increasingly complex applications and operating systems. Such displays typically have a wide range of colors available, as well. On the other hand, displays associated with portable devices such as wireless telephones and PDA's are small and often getting smaller, to enhance, e.g., portability and battery life. These small displays also tend to be monochrome displays rather than color, because of cost, resolution and power considerations. Although not necessarily portable, displays included in automobiles or appliances may also be small monochrome displays, to keep costs down and avoid taking space needed for other functions of the system. This variation in display size and capability for different computational devices means that a GUI which allows effective monitoring of critical indicators when a system administrator's console is used may be very difficult to use when connected remotely with a cellular telephone. For example, text descriptions or icon variations easily understood using a large display may be indistinguishable on a small one. Differences in color used to distinguish, e.g., threshold crossings of variables are naturally not effectively discerned on a monochrome display.

One approach to the problems presented by differing display capabilities would be to use different representations of critical indicators to be monitored on different displays, with more complex (and possibly more complete) representations used for higher-capability displays. Such an approach may be disadvantageous, however, in requiring a user of multiple display screens to become familiar with multiple representations of the monitored indicators. Use of multiple representations may make it more difficult to develop a desirable intuitive feel for any one representation. It would therefore be desirable to develop a method and system of monitoring critical indicators which may be effectively used on displays having diverse sizes and capabilities.

SUMMARY OF THE INVENTION

The problems outlined above are in large part addressed by a method and system in which icons representing critical indicators are displayed in superposition with a reference shape. The reference shape is divided into "higher-interest" and "lower-interest" portions, such that display of an icon over the higher-interest portion of the reference shape indicates a higher-interest value of the corresponding variable. In the case of a system administration application, for example, display of an icon over the higher-interest portion may indicate that the value of the corresponding variable has crossed a threshold into a range associated with a performance problem for the system or network. For a stock-monitoring application, display of an icon over the higher-interest portion could indicate, for example, that the price of the corresponding stock has crossed a "buy" or "sell"

threshold preset by the user. In the case of the horse-racing example mentioned above, display of an icon over the higher-interest portion may indicate, for example, that a corresponding race is currently underway, or that a particular horse corresponding to the icon has placed at or above a preset level (e.g., second place) in its most recent race.

The reference shape is preferably elongated horizontally, and an upper portion of the shape is typically designated as the higher-interest portion, while the lower portion of the shape is designated the lower-interest portion. In one preferred embodiment, the reference shape is an elongated oval. Multiple icons, corresponding to multiple monitored variables, may be displayed over the reference shape. Each monitored variable is preferably allocated a vertical "slice" of the reference shape, such that the position of the corresponding icon when the variable is in the higher-interest state is laterally aligned with (i.e., along the same vertical line as) the position of the icon when the variable is in the lower-interest state. In some embodiments, a single icon representing the present status of the corresponding variable is positioned over either the higher-interest or lower-interest portion of the reference shape. Alternatively, two icons may be used for each variable, where one is positioned over the higher-interest portion and the other over the lower-interest portion. In such an embodiment, the icon representing the present value of the variable is given a distinctive appearance, such as being displayed with a higher contrast.

Use of the reference shape to indicate the status (higher-interest or lower-interest) of a monitored variable is believed to confer several advantages. The relatively large size of the reference shape (it may be scaled to essentially fill a display, if desired) is believed to make the status of the monitored variables visible at a glance, even on a small display. Because the status is indicated by position of the icon, differences in individual icon characteristics such as color or shape, which may be difficult to discern on a small and/or monochrome display, need not be relied upon. Since detailed icon structures are therefore not necessary, the representation of the monitored variables may be implemented using a relatively simple reference shape and simple icon geometries (such as simple shapes). This simplicity may allow the representation to be scaled to small sizes without loss of information content. In this way, the same representation may be used on displays for diverse computational devices, freeing the user from the need to use different representations on different displays, and freeing application developers from the need to develop multiple representations. Cross-platform interoperability may therefore be enhanced.

In addition to providing a rapid indication of the status of a monitored variable, the representation described above may include a method of indicating that the status of the variable has changed, from higher-interest to lower-interest or vice versa. The status change may be indicated by changing the appearance of the icon corresponding to the present status of a monitored variable. For example, the icon may be made to blink, or to move back and forth. Such a change in appearance is typically implemented for a predetermined period of time following the change of status, where the time period may be set by an application developer and/or a user. Such an indication that the status of a variable has changed is believed to be advantageous in situations for which rapid action is required in response to changes in monitored variables. As in the case of other aspects of the display representation described above, this change in icon appearance is believed to be conveniently observed, even on low-capability displays. The time at which a status change occurs may also be stored and provided to a viewer through a GUI implementing the display representation described herein. In an embodiment, the time of the status change may be shown on the display screen during the time period of the above-described icon appearance change. Alternatively, the time may be displayed in response to a user selection of the icon corresponding to the present status of the variable. Display of the time at which a status change occurs may be important in, for example, allowing an assessment of the potential effects of the status change.

In some applications, it is desirable to know not just the time of the most recent status change of a variable, but a history of multiple status changes. Stock prices, for example, may cross a threshold value in different directions numerous times a day. The same is true of certain computer system and network quantities, depending on, for example, the degree of utilization of the system or network. As an example, a person providing technical support for a computer network may receive a report of a particular failure, but then not be able to locate a problem. A history of status changes of critical network indicators during the time elapsed since the failure could help in comparing the situation at the time of the failure and that at the time of the diagnosis attempt. In an embodiment of the methods described herein, the above-described representation of critical indicator status using a reference shape is combined with storage of information relating to each crossing of a monitored variable between its higher-interest and lower-interest ranges. The information may include, for example, the time and direction of each crossing, and/or a description of a particular event associated with the crossing. The stored information may then be displayed as a history of the status changes of a given monitored variable. Such a history is typically displayed in response to a user selection of the corresponding icon.

An embodiment of a system for transferring information within a client/server network includes a display controller operably coupled to a display screen. The display controller is adapted to display a reference shape on the display screen, as well as a superimposed present status icon corresponding to the present status of a monitored variable. The display controller is further adapted to position the present status icon over a first portion of the reference shape when the present value of the monitored variable is within a higher-interest range, or over a second portion of the reference shape when the present value of the variable is within a lower-interest range. The system may further include a storage medium operably coupled to the display controller, where the storage medium is adapted to store information relating to the higher-interest and lower-interest ranges. The display controller, storage medium and display screen may or may not all be associated with the same computational device. In an embodiment, the display controller and storage medium are associated with one device, while the display screen is on a different device.

In embodiments of the system, the display controller may be further adapted to change the appearance of the present status icon for a predetermined time interval after a crossing of the corresponding variable between the higher-interest range and lower-interest range has occurred. Alternatively or in addition, the display controller may be adapted to display information regarding the time of such a crossing, and the storage medium may be adapted to store this time-related information. In some embodiments, the display controller may be further adapted to display a history of status changes of the monitored variable, where the history includes a time of each crossing between the higher-interest and lower-interest range. In such an embodiment, the display controller may be further adapted to store this history information.

In addition to the method and system described above, a computer-usable carrier medium is contemplated herein. The carrier medium may be a storage medium, such as a magnetic or optical disk, a magnetic tape, or a memory. In addition, the carrier medium may be a transmission medium, such as a wire, cable, or wireless medium along which data or program instructions are transmitted, or a signal carrying the data or program instructions along such a wire, cable or wireless medium. The carrier medium may contain program instructions executable for carrying out embodiments of the methods described herein. Alternatively or in addition to such program instructions, the carrier medium may contain data used in implementing the methods described herein, such as data defining higher-interest and lower-interest ranges for variables, or time and direction data for crossings of a variable between these ranges.

BRIEF DESCRIPTION OF THE DRAWINGS

Other objects and advantages of the invention will become apparent upon reading the following detailed description and upon reference to the accompanying drawings in which.

Figure 1:
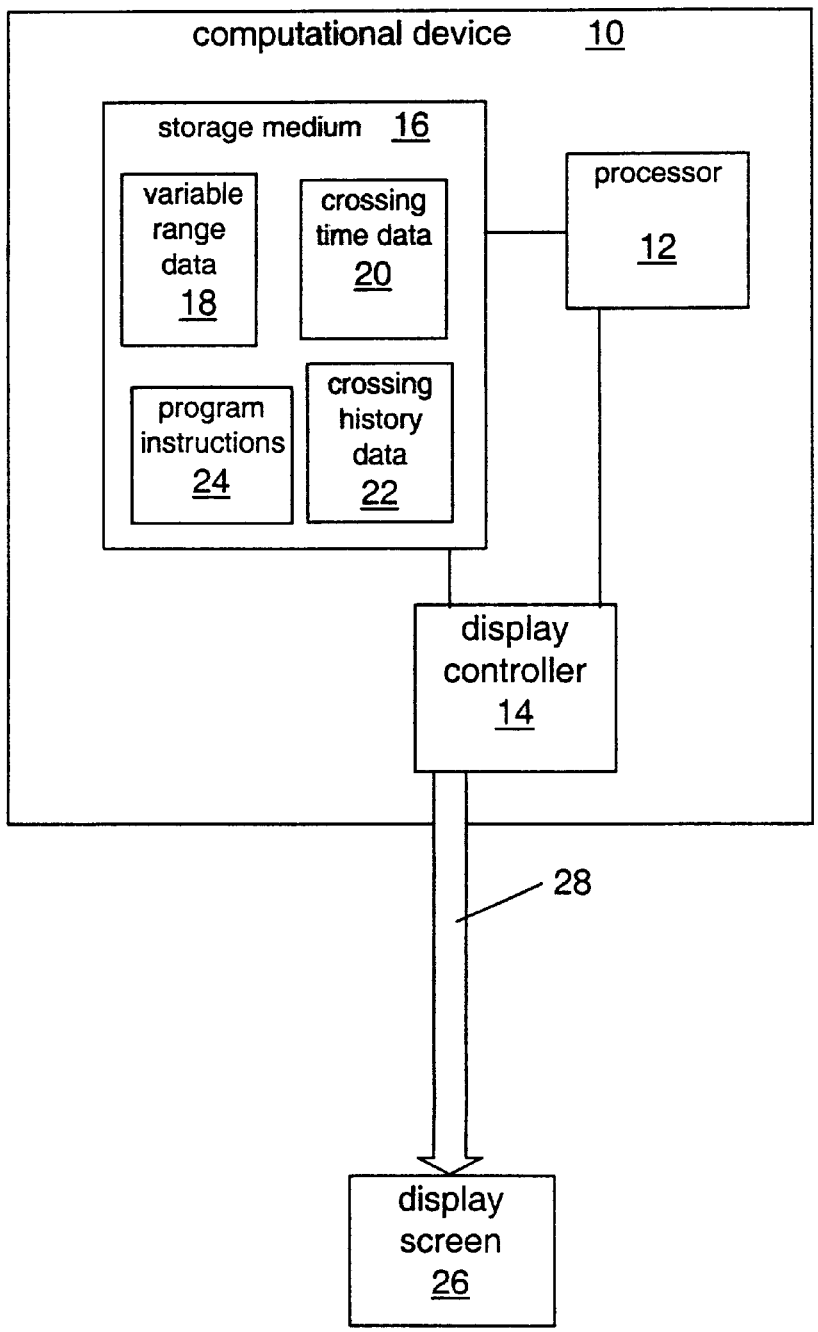
FIG. 1 is a block diagram illustrating an embodiment of a system for displaying information.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

A block diagram illustrating an exemplary embodiment of a system which may be used to implement the methods described herein is shown in FIG. 1. Computational device 10 includes processor 12, display controller 14, and storage medium 16. Display controller 14 configures data for display on a display screen such as display screen 26, and may provide an interface between computational device 10 and display screen 26. Storage medium 16 may take many forms, such as volatile or nonvolatile memory, a magnetic disk such as a hard drive or floppy drive, an optical disk, and/or a magnetic tape. In the embodiment of FIG. 1, storage medium 16 includes variable range data 18, crossing time data 20, crossing history data 22 and program instructions 24, also referred to as program executables. The program instructions may be stored as "executable files" in a direct access storage device such as a disk and loaded into memory during execution. Variable range data 18 identifies higher-interest and lower-interest ranges for the values of each variable to be monitored on the display screen. Crossing time data 20 typically includes the time at which the value of a variable has most recently crossed between its higher-interest and lower-interest ranges. Crossing history data 22 may include times for multiple range crossings of each variable, as well as the direction of each crossing (from higher-interest to lower-interest, or vice versa). Other information may also be included in crossing history data 22, such as a value of the monitored variable at the time of the crossing, or information on an event associated with the crossing. Program instructions 24 may include various program instructions used to implement functions of computational device 10, such as program instructions used to implement the methods described herein.

Transmission medium 28 may be used to connect computational device 10 to peripheral devices or networked devices. In the embodiment of FIG. 1, display controller 14 is connected to display screen 26 using medium 28. Transmission medium 28 may include, for example, a wire, cable, circuit board trace, wireless transmission path, or a combination of these. Display screen 26 may be formed using various technologies, including liquid crystal display (LCD) technology, cathode ray tube (CRT) technology or projection technologies. Furthermore, display screen 26 may have any of the various sizes and capabilities typically found in displays on diverse computational devices. In some embodiments, display screen 26 may be directly connected to computational device 10, as, e.g., a monitor or built-in display. Alternatively, display screen 26 may be associated with a different computational device than computational device 10. In such an embodiment, display screen 26 may be associated with a separate display controller for that device (not shown), which may interact with display controller 14.

In FIG. 1 and any other block diagrams appearing herein, the blocks are intended to represent functionality rather than specific structure. Implementation of the represented system using circuitry and/or software could involve combination of multiple blocks into a single circuit or device, or combination of multiple circuits and/or devices to realize the function of a block. For example, processor 12 and display controller 14 may be included on the same semiconductor chip, or display controller 14 may itself contain a processor. Furthermore, the system may include other elements not explicitly shown. For example, a computational device such as computational device 10 is typically associated with at least one input device such as a keyboard and/or pointing device (e.g., a mouse), and at least one output device such as a display or printer.

Figure 2:
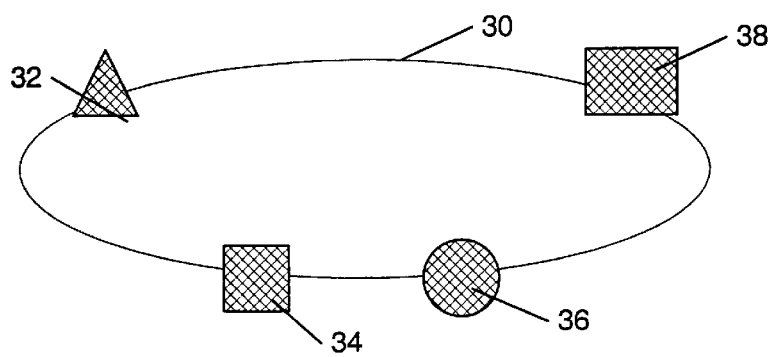
FIGS. 2(a)–2(c) illustrate embodiments of the information display described herein.
Figure 2:
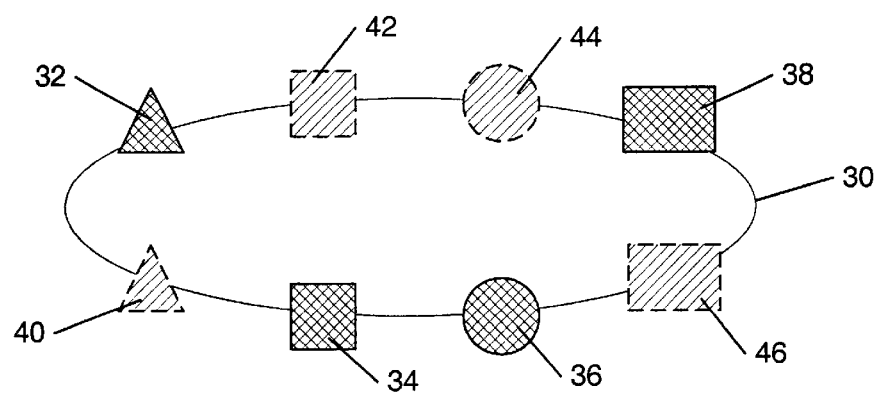
Figure 2:
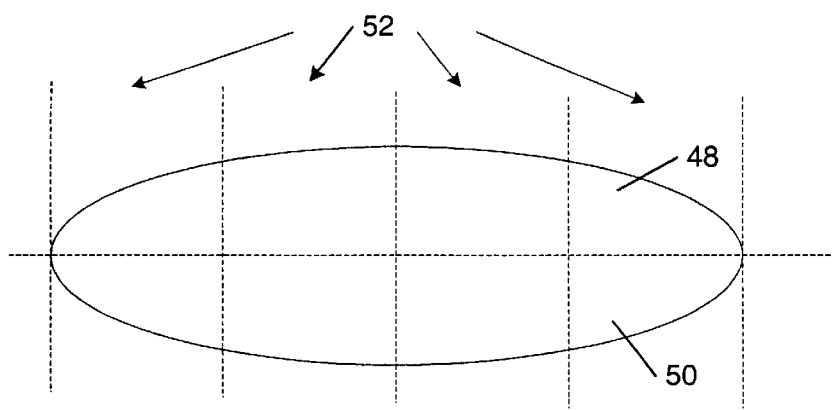

Exemplary representations for monitoring of critical indicators are shown in FIG. 2. For example, an image which may appear on a display screen such as screen 26 of FIG. 1 is shown in FIG. 2(a). The representation of FIG. 2(a) includes reference shape 30 and present status icons 32, 34, 36 and 38. In the embodiments of FIG. 2, reference shape 30 is an oval elongated in the horizontal direction, but other shapes may also be used, as discussed in more detail with reference to FIG. 3 below. Reference shape 30 provides a reference to the viewer for the positions of present status icons 32–38. In particular, icons 32 and 38 are positioned over an upper portion of shape 30, while icons 34 and 36 are positioned over the lower portion. The upper portion of the reference shape is typically designated the "higher-interest" portion. In such an embodiment, the representation of FIG.

2(a) indicates that the variables corresponding to icons 32 and 38 are presently within their higher-interest ranges. The higher-interest and lower-interest ranges are specific to each variable being monitored. If, for example, icon 32 corresponds to space available on a particular disk associated with a computer system, a system administrator may wish to be alerted to a present value of this available space below some predetermined threshold value. A value below this threshold value could therefore be designated as being within the higher-interest range for this variable. In the case of an investor monitoring stock prices, the higher-interest range for a particular stock could be defined as either above or below a threshold value, depending, for example, on whether the investor were interested in an opportunity to sell or one to buy. The image in FIG. 2(a) is believed to make clear at a glance that the variables corresponding to icons 32 and 38 are in their higher-interest ranges, while those corresponding to icons 34 and 36 are in their lower-interest ranges (assuming that the upper portion of shape 30 is the higher-interest portion).

In an alternative embodiment shown in FIG. 2(b), alternative status icons 40, 42, 44 and 46 are displayed in addition to the reference shape and present status icons. The present and alternative status icons corresponding to a given variable are laterally aligned, such that the icons are positioned along the same perpendicular to a horizontal line bisecting reference shape 30. The alternative status icons are positioned over the opposite portions of reference shape 30 as are their corresponding present status icons. These icons therefore correspond to an alternative status of the corresponding variable, or the status that the variable does not currently have. In the event of a change in status of a variable, the positions of the present status and alternative status icons corresponding to the variable are switched. Use of the alternative status icons may aid in delineating the particular "slice" of the reference shape allocated to a given variable, and may help to familiarize a viewer with the two possible status positions of an icon (higher-interest and lower-interest). The present status icons are in some way distinguished in appearance from their corresponding alternative status icons. In the embodiment of FIG. 2(b), the present status icons are displayed with darker contrast (e.g., denser fill and/or solid rather than dashed lines). Other distinctions could also be used, however, such as making the present status icons have a different size or shape than the alternative status icons.

A partitioning of reference shape 30 corresponding to the embodiments of FIGS. 2(a) and 2(b) is shown in FIG. 2(c). In a preferred embodiment, upper portion 48 and lower portion 50 of the reference shape are separated by the horizontal line bisecting the shape. The portions need not be halves of the shape in all embodiments, however. Upper portion 48 is typically designated the higher-interest portion, and lower portion 50 the lower-interest portion. This designation could be switched, although having the higher-interest portion on top is believed to be more intuitive for most applications. In the examples given hereinafter, the upper portion of a reference shape will be designated the higher-interest portion, unless specified otherwise. Sections 52 of shape 30, separated by the vertical lines in FIG. 2(c), are each reserved for icons corresponding to a single monitored variable. Although four sections are shown, many more sections for more monitored variables could be designated, depending on the relative sizes of the reference shape and the icons.

The representations shown in FIG. 2 represent merely exemplary embodiments, and many other embodiments are possible and contemplated. For example, the reference shape and/or icons shown in FIG. 2 could in some embodiments be formed from dashed lines rather than solid lines. In some embodiments, the icons could be positioned within the interior of reference shape 30, rather than on the perimeter (as long as the icons remained positioned within the proper portion of the shape). Use of the perimeter is believed to be preferable, however, in that a greater visual distinction between the two variable states is observed. As another example, guide lines could be provided on the representations of FIGS. 2(a) or 2(b) in some embodiments. Such guide lines could delineate, for example, the boundary between the higher-interest and lower-interest portions of shape 30, the boundaries between the sections (such as sections 52) reserved for each monitored variable, or the perpendiculars along which the higher-interest and lower-interest positions are aligned.

Figure 3:
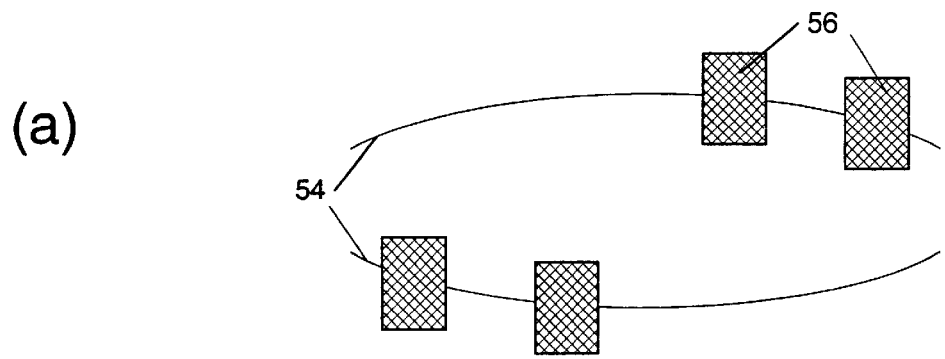
FIGS. 3(a)–3(c) illustrate exemplary reference shape and icon embodiments suitable for the information display methods described herein.
Figure 3:
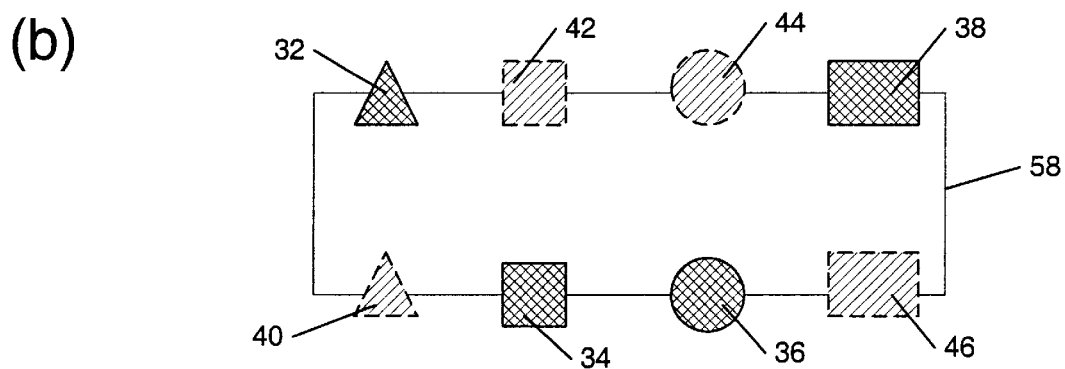
Figure 3:
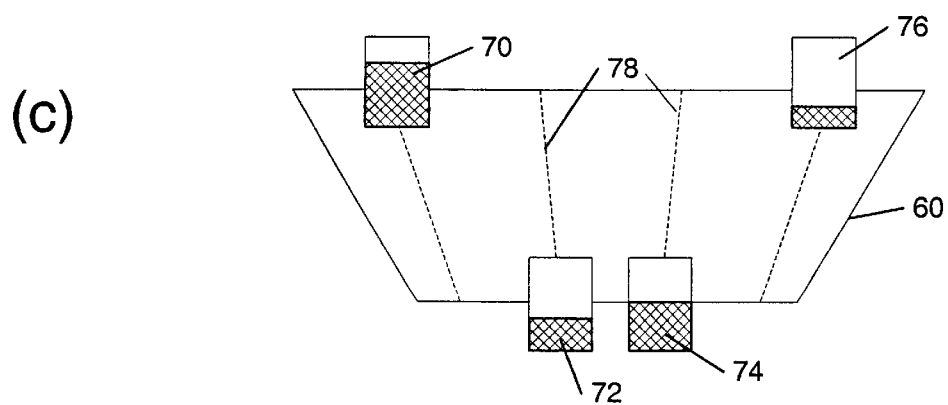

Some of the many embodiments of reference shapes and icon configurations which may be used in the display representation described herein are shown in FIG. 3. As illustrated by FIG. 3(a), the reference shape does not necessarily need to be a closed shape. A shape such as open-ended oval 54 may be used in some embodiments. The reference shape is preferably one that effectively guides the eye in distinguishing between higher-interest and lower-interest states of the monitored variables, but otherwise need not have any specific form. In the embodiment of FIG. 3(a), present status icons 56 all have the same shape, although each corresponds to a different monitored variable. Using relatively few simple shapes for the icons may be beneficial in reducing the complexity of the representation, so that it may be more effectively scaled to fit small displays without loss of information. Whether identical icons or distinctive icons are used for the different variables, the graphical user interface may be configured to identify the variable corresponding to each icon upon a user request. For example, an identifying text or graphic could be displayed upon pointing to an icon using a pointing device such as a mouse, in a manner similar to use of a "mouseover" in the JavaScript language. The identifying information could alternatively be displayed in response to an actual "click" on (or selection of) the corresponding icon.

Shapes other than ovals may also be used for reference shapes, as illustrated by the embodiments of FIGS. 3(b) and 3(c). Rectangular reference shape 58 may be used in some embodiments, for example. Although the rectangular shape has similar symmetry to the oval shape of FIG. 2, it is believed that the oval shape may be more aesthetically pleasing and possibly less fatiguing to use. For example, if the reference shape is scaled to nearly fill a small rectangular display screen, the representation using the curved oval shape may be more easily distinguishable from the screen edges than one using a rectangular shape. The variation in height of the oval along its horizontal dimension may also aid the eye in matching the higher-interest and lower-interest icon positions corresponding to each variable, in that the matching positions share a vertical displacement (from the maximum height) as well as a lateral position which is different than that for an adjacent pair of icon positions. Such improved matching of the higher-interest and lower-interest positions for each variable may be increasingly important for representations containing a large number of monitored variables. Rectangles or other shapes may be suitable in some embodiments, however.

In some embodiments, the reference shape may not be vertically and/or horizontally symmetric. For example, reference shape 60 in FIG. 3(c) is not vertically symmetric. In this embodiment, the higher-interest and lower-interest positions of an icon corresponding to a particular variable are not along a perpendicular to the horizontal line bisecting the reference shape, but rather along slanted lines 78. A non-symmetric shape such as reference shape 60 may in some embodiments be useful in, for example, emphasizing the higher-interest portion of the shape over the lower-interest portion. Visible guide lines such as lines 78 would be more likely to be needed in such an embodiment, however. Another possible icon embodiment is also shown in FIG. 3(c). Square icons 70, 72, 74 and 76 are partially "filled" to give a rough indication of the present value of the corresponding variable. For example, icon 70 appears to represent a variable currently having a relatively high value (as compared to its normal range), while icon 76 appears to represent a variable currently having a relatively low value. Both of these icons are in the higher-interest portion of the reference shape in this embodiment, indicating that the present value of each of the corresponding variables is within its higher-interest range.

In general, symmetric reference shapes and simple icon designs are believed to be most conducive to rapid determination of a variable's state and to scalability of the display to small sizes. As is partially illustrated by the embodiments of FIG. 3, however, many variations of reference shape and icon configuration may be used. Although the representations described herein do not rely upon color to indicate the status of a variable for reasons described above, color may of course be included if desired, possibly to make the display more aesthetically pleasing on screens which will support it.

Figure 4:
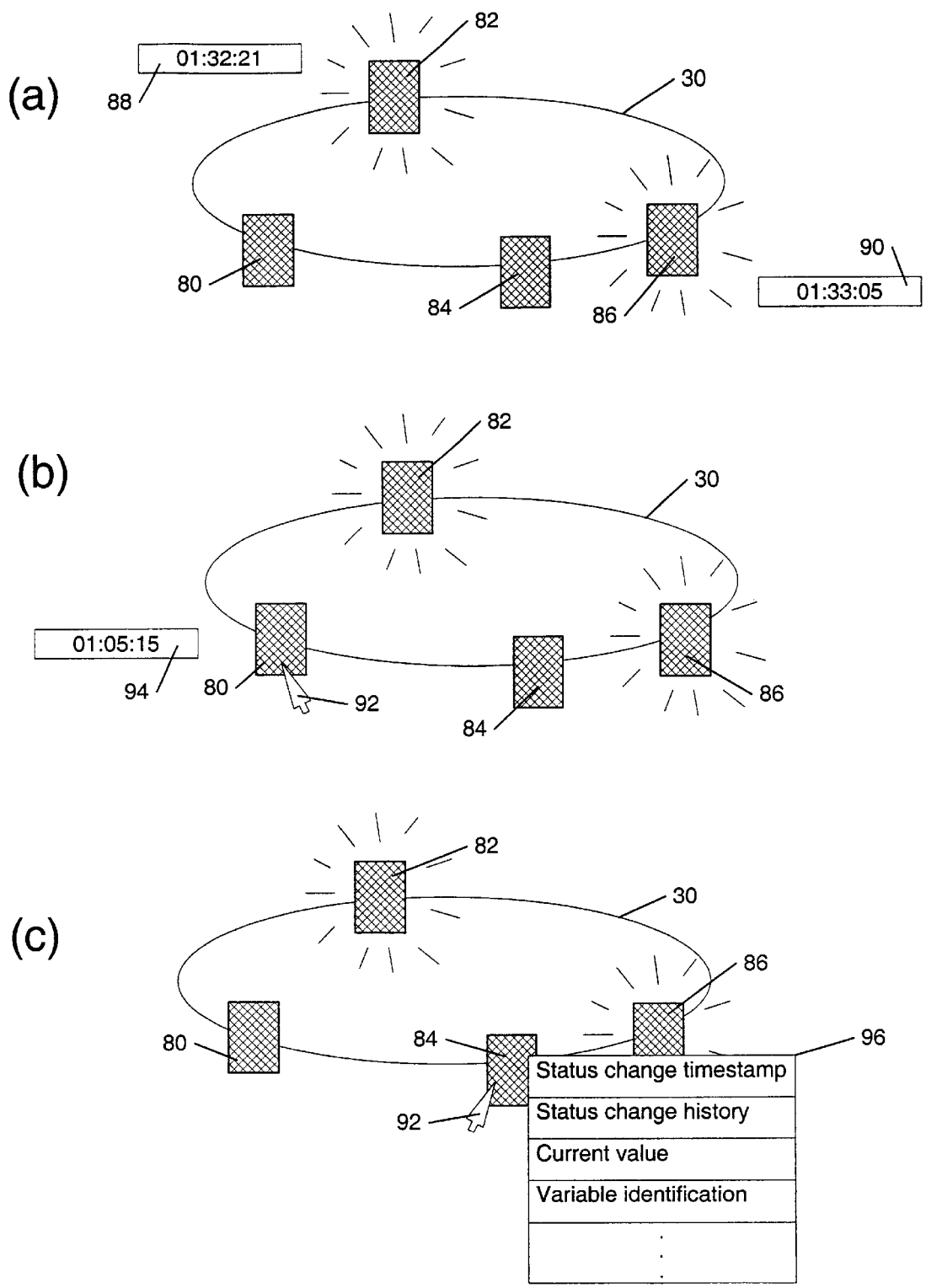
FIGS. 4(a)–4(c) illustrate embodiments of indicating when a monitored variable has crossed between its higher-interest and lower-interest ranges.

Turning now to FIG. 4, exemplary embodiments are shown of display images which may result from the methods described herein of indicating a status change of a variable. In the embodiment of FIG. 4(a), icons 80, 82, 84 and 86 are displayed with reference shape 30. The short lines surrounding icons 82 and 86 are used in the figure to indicate that these icons are blinking on the display. The icons are caused to blink in this embodiment because they have recently crossed between the higher-interest and lower-interest portions of the reference shape. The variable corresponding to icon 82 has recently crossed from its lower-interest range to its higher-interest range, while that corresponding to icon 86 has recently crossed from its higher-interest range to its lower-interest range. The blinking is initiated upon the range crossing, and continued for a predetermined time interval, where the time interval may be set by, for example, a developer of an application using the display representation, or a viewer of the display. Other ways of changing an icon's appearance may be used instead of, or in addition to, the blinking shown in FIG. 4(a). For example, an icon may be moved back and forth about its usual position, or the size of the icon could be alternately increased and decreased. In the embodiment of FIG. 4(a), timestamps 88 and 90 are displayed in the vicinity of blinking icons 82 and 86, respectively. Timestamp 88 shows the time at which the variable corresponding to icon 82 most recently crossed from its lower-interest to higher-interest range, while timestamp 90 shows the time at which the variable corresponding to icon 86 crossed from its higher-interest to lower-interest range. In this embodiment, the timestamps are displayed for the same time interval during which the icon appearance is changed, as part of an alert to the viewer that the status of the corresponding variable has changed.

Alternatively, a timestamp could be displayed only upon request by a viewer (or "user"), as illustrated in FIG. 4(b). Pointer 92 may be moved across the display screen using a pointing device such as a mouse or trackball. Icon 80 underlying pointer 92 may be selected, typically by pushing a button on the pointing device. Timestamp 94, indicating the most recent time at which the variable corresponding to icon 80 crossed from its higher-interest to lower-interest range, may be displayed in response to such a selection. The selection of an icon may therefore be considered a request by a viewer to see the corresponding timestamp of the corresponding variable's last status change. In some embodiments, simply positioning a pointer over an icon may be sufficient to cause display of the timestamp, without an actual selection of the icon being needed. In the embodiment of FIG. 4(b), timestamps corresponding to icons 82 and 86 are not automatically displayed in response to the recent status changes of the corresponding variables. Timestamps for these icons may be viewed by user request in the same manner illustrated for icon 80.

In order to allow other information relating to a monitored variable to be accessed in addition to timestamp information, selection of an icon may result in appearance of, for example, a menu bar, as shown in the embodiment of FIG. 4(c). Menu bar 96 appears upon selection of icon 84 using pointer 92. Various pieces of information regarding the variable corresponding to icon 84 are then available by selection with the pointer. A status change timestamp, similar to timestamps 88, 90 and 94 discussed above, may be chosen, as may a history of multiple recent status changes (discussed further below with reference to FIG. 5). Other information available may include, for example, the current value of the variable, an identification of the variable being monitored, or information regarding an event associated with the status change.

Figure 5:
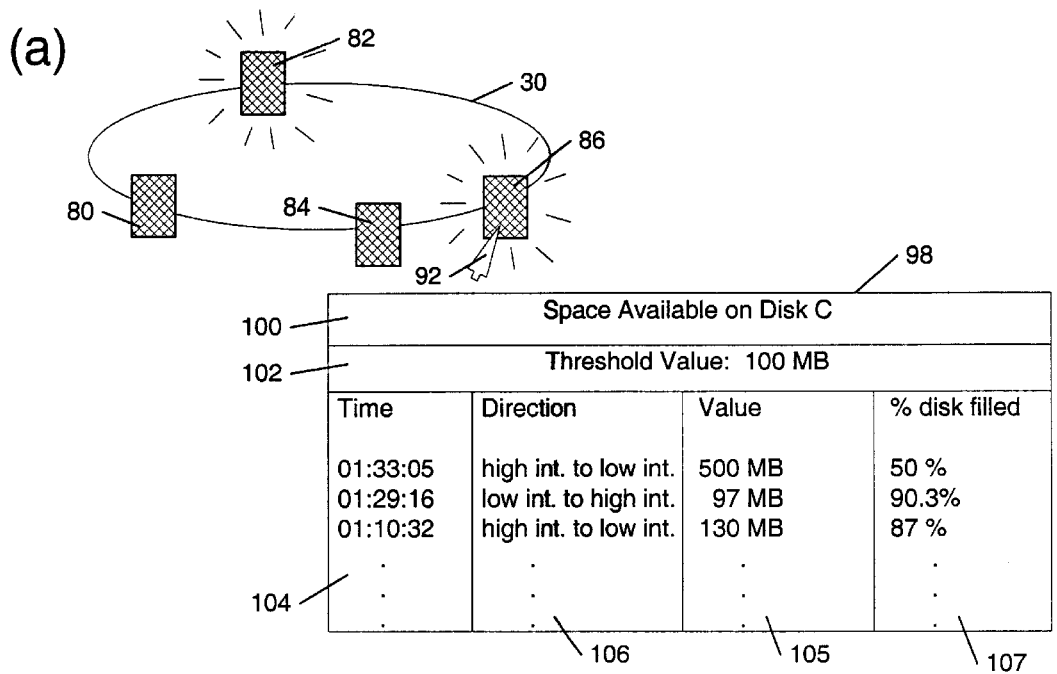
FIGS. 5(a)–5(b) illustrate embodiments of displaying a history of status changes of a monitored variable.
Figure 5:
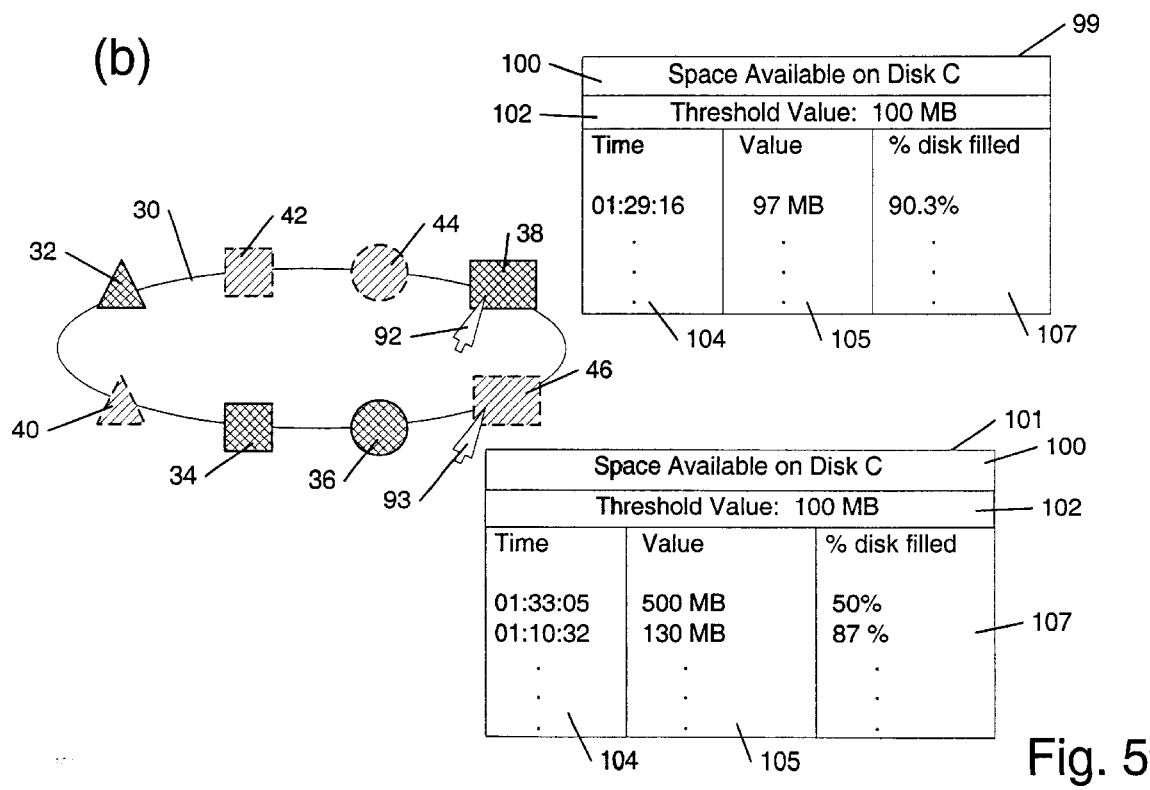

Exemplary embodiments of display of history information are shown in FIG. 5. An example of a history display within the representation of FIG. 4 is shown in FIG. 5(a). Pointer 92 is moved to overlie icon 86, giving rise to the display of history 98. In some embodiments, history 98 could display automatically (without a user's pointing to or selecting an icon), for example, during the time interval following a status change of a variable. Such an embodiment is believed to typically require excessive display space, however. In another embodiment, history 98 could be displayed when pointer 92 is positioned over icon 86. History 98 could also display only upon selection of icon 86, or through selection and then use of a menu bar such as bar 96 of FIG. 4(c). In the embodiment of FIG. 5, history 98 includes variable identification 100, threshold value identification 102, time information 104, direction information 106, variable value information 105, and percentage filled information 107. The variable corresponding to icon 86 is identified as "Space Available on Disk C", and the threshold value of this variable is given as 100 megabytes (MB). The range higher than 100 MB would therefore reasonably be considered the lower-interest range, while that lower than 100 MB would be the higher-interest range (since a problem could occur if the disk space gets too low). In some embodiments, definitions of the higher-interest and lower-interest ranges could also be given in the history.

Time information 104 includes timestamps for the most recent crossings of the variable between its higher-interest and lower-interest ranges. The most recent of the timestamps corresponds to timestamp 90 for the same variable shown in FIG. 4(a). Direction information 106 includes the direction of each of the crossings, from the higher-interest range to the lower-interest range, or vice versa. The number of crossings appropriately included in the history may depend on the nature of the variable being monitored. As for many parameters associated with the display representations described herein, this number of crossings could be set or changed by, for example, an application developer or a user of the display. In some embodiments, the crossing direction information in the history could be given in terms of the actual variable units (e.g., from greater disk space to lesser, or vice versa), rather than in terms of higher and lower-interest ranges. In the embodiment of FIG. 5(a), the history also includes variable value information 105, which is the value of the available disk space at the time of each threshold crossing (the value moved to). Percentage filled information 107 gives the percentage filling of Disk C corresponding to each value. In this example, Disk C has a one gigabyte capacity.

A different embodiment of history display, used with a representation such as that of FIG. 2(b), is shown in FIG. 5(b). Pointer 92 is positioned over present value icon 38, resulting in the display of history 99. As discussed above the display could be in response to, for example, a selection ("clicking") of the icon with the pointer, simply moving the pointer over the icon, or selecting a portion of a menu bar. History 99 is similar to history 98 of FIG. 5(a) except that only crossings of the variable into its higher-interest range are included. In the embodiment of FIG. 5(b), selection of other icons in the higher-interest portion of shape 30 (e.g., icons 32, 42 or 44) would result in similar history displays in which the crossings into the higher-interest range of the variable corresponding to the icon are included. Selection of (or possibly pointing to) an icon in the lower-interest portion of shape 30, on the other hand, may result in a different history display. Pointer 93 is positioned over alternative status icon 46, resulting in display of history 101. History 101 is similar to histories 98 and 99, except that only crossings of the variable corresponding to icon 46 into its lower-interest range are included. In this embodiment, similar histories could also be displayed for the variables corresponding to icons 40, 34 and 36. Other information not shown in FIG. 5 could be included in history displays such as 98, 99 and 101. For example, a description of an event associated with each crossing could be included. The event could be one which may have given rise to the threshold crossing. In the example of FIG. 5, such an event could be the saving of a particular file to Disk C by a particular application program.

Figure 6:
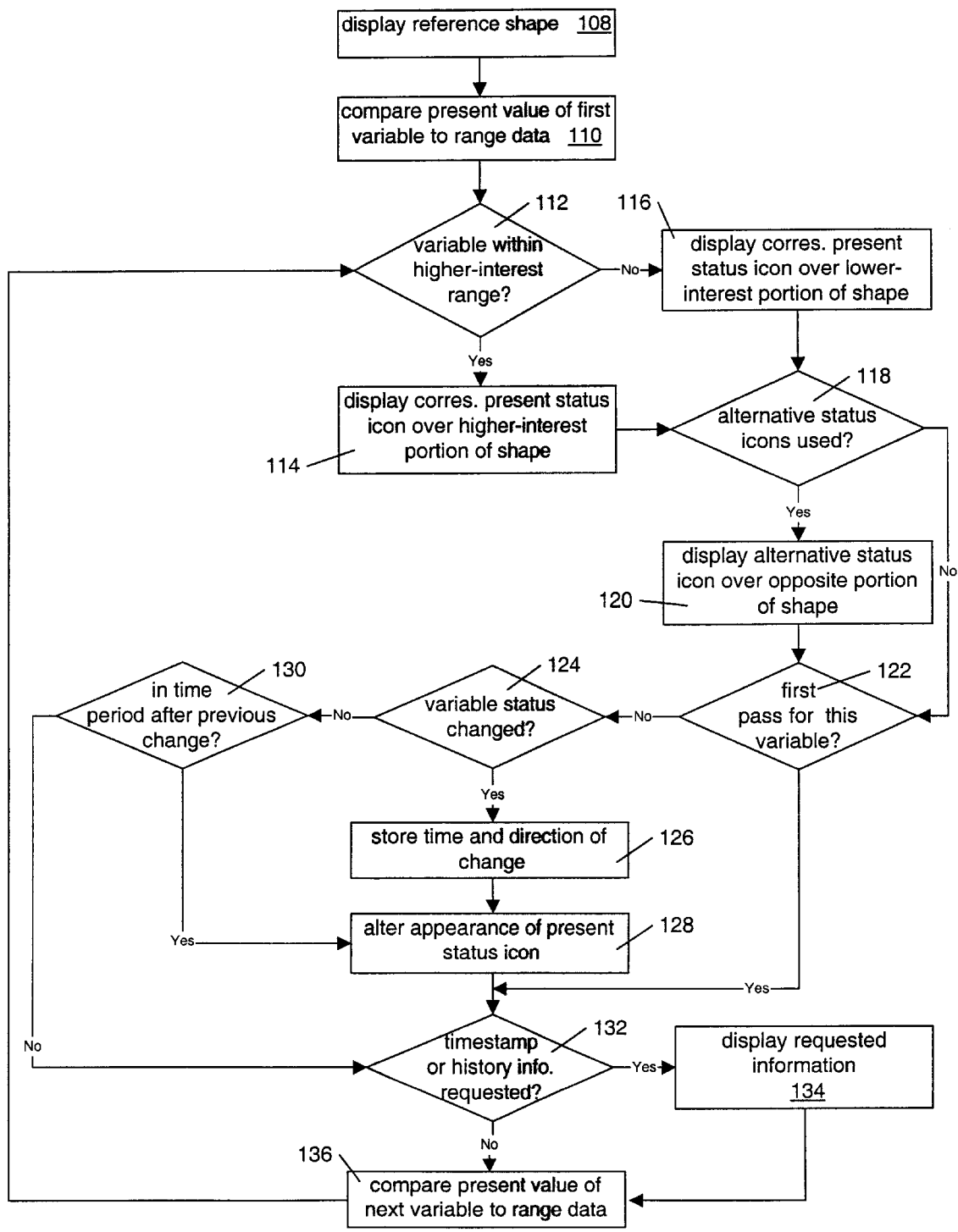
FIG. 6 is a flow diagram illustrating an embodiment of a method for displaying information.

A flow diagram illustrating an embodiment of a method for displaying information is shown in FIG. 6. The method of FIG. 6 may be performed using a system such as that shown in FIG. 1, and may be part of an application program running on a computational device such as device 10 of FIG. 1. In the embodiment of FIG. 6, a continuous loop is performed in which each of the variables to be monitored is polled in turn and the display appropriately updated. If this method were applied, for example, to the set of variables corresponding to the display of FIG. 2(a), the position of icon 32 would be updated on the display screen, then icon 34, then 36, then 38, then 32 again, and so forth. To begin the display of monitored variables, a reference shape is displayed on a display screen (box 108). This is typically done by a display controller such as display controller 14 of FIG. 1, coupled to a display screen such as screen 26. The present value of the first monitored variable is then compared to its predetermined higher-interest and lower-interest ranges (box 110). The present value of the variable may be obtained by, for example, processor 12 of FIG. 1. The present value may, for example, be provided by an application running on computational device 10, obtained from another device networked to device 10 (using a transmission medium similar to medium 28), or possibly input by a user of the computational device. Information regarding the predetermined higher-interest and lower-interest ranges for the variable may be included in variable range data 18 of FIG. 1. The ranges may be defined by persons including an application developer or a viewer of the display screen, and may be established by defining a threshold value of the variable at the boundary between the higher-interest and lower-interest ranges.

The comparison of the present value of the monitored variable to the higher-interest and lower-interest ranges, typically performed by a processor such as processor 12 (or possibly by display controller 14, especially if it contains a processor), is used to determine whether the monitored variable is within the higher-interest range (decision box 112 of FIG. 6). If so, a present status icon is displayed (typically by a display controller) over the higher-interest portion of the reference shape, in a lateral position reserved for the corresponding variable (box 114). If the value of the monitored variable is not within its higher-interest range, the present status icon is instead displayed over the lower-interest portion of the reference shape (box 116). In embodiments for which alternative status icons are used (decision box 118), an alternative status icon is displayed over the opposite portion of the reference shape as the present status icon corresponding to the same variable (box 120).

If a first pass through the flow diagram of FIG. 6 is being made for a particular variable (decision box 122), then no change of the variable status can be detected during that pass. An example of a way to determine whether it is the first pass through the method is to reserve a set of storage locations to store the previous status of each variable. These storage locations could be initialized at the beginning of the method flow (e.g., before step 108), with a value indicating the initial pass through the method. The storage location could then be checked during step 122, and if the initial value were present (rather than, e.g., "high-interest" or "low-interest") a determination made that the first pass was in progress. If a first pass is not being made, it is determined whether the present status of the variable has changed as compared to the previous pass (decision box 124). Such a determination could be made by comparing the present status of the variable to the previous status, stored in the location discussed above with reference to step 122. The previous status location could then be updated later in the sequence, such as subsequent to step 126. If there has been a change in status, the time and direction of the change (current time, and whether the change is from high-interest to low-interest or vice versa) are stored (box 126). Alternatively or in addition, other information such as the value of the variable or a description of an event associated with the change in status could be stored. In the embodiment of FIG. 6, the appearance of the present status icon is also altered during a time interval following the change in status (box 128). This altering of appearance may include making the icon blink, or other changes in appearance, some of which are described above in the discussion of FIG. 4. If there has not been a change in status, but the time period following a previous change in status has not expired (box 130), the alteration of the icon appearance is continued.

If timestamp or history information is requested by a user (decision box 132), the requested information is displayed (box 134). Such a user request may include, for example, a positioning of a pointing device over an icon, selection of an icon, and/or selection of a choice within a menu bar. The present value of the next monitored variable is then compared to its range data (box 136), and the loop is started again. Multiple variations of the method of FIG. 6 are possible and contemplated. In some embodiments, for example, display of timestamp and/or history information could be done automatically during the time period for which the appearance of the present status icon is altered.

Program instructions, such as instructions 24 of FIG. 1, implementing methods such as that illustrated by FIG. 6 may be transmitted over or stored on a carrier medium. The carrier medium may be a transmission medium such as a wire, cable, or wireless transmission link, or a signal traveling along such a wire, cable or link. The carrier medium may also be a storage medium, such as a volatile or non-volatile memory (e.g., read-only memory or random access memory), a magnetic or optical disk, or a magnetic tape.

It will be appreciated by those skilled in the art having the benefit of this disclosure that this invention is believed to provide a system and method for allowing critical indicators to be monitored on a display screen. Furthermore, it is also to be understood that the form of the invention shown and described is to be taken as exemplary, presently preferred embodiments. Various modifications and changes may be made without departing from the spirit and scope of the invention as set forth in the claims. For example, the system and methods described herein may be implemented using many combinations of hardware and/or software, and at one or more of many different levels of hardware and/or software, as is the case with many computer-related applications. It is intended that the following claims be interpreted to embrace all such modifications and changes.

What is claimed is:

1. A method of displaying information, comprising:
    superimposing a first icon upon a first or second portion of a reference shape indicative of whether a present value of a first monitored variable corresponding to the first icon is within a first predetermined higher-interest range or within a first predetermined lower-interest range, wherein the first portion of the reference shape corresponds to the first predetermined higher-interest range and the second portion of the reference shape corresponds to the first predetermined lower-interest range; and
    superimposing a first alternative status icon upon the reference shape such that the first alternative status icon is positioned over the second of the reference shape when the first icon is positioned over the second portion of the reference shape, and the first alternative status icon is positioned over the second portioned of the reference shape when the first icon is positioned over the first portioned of the reference shape, wherein the first alternative status icon correspond to an alternative status of the first monitored variable.

2. The method as recited in claim 1, wherein said superimposing comprises displaying the first icon corresponding to the present status of the first monitored variable.

3. The method as recited in claim 1, wherein a transition between the first predetermined higher-interest range and the first predetermined lower-interest range comprises a crossing of a first predetermined threshold value of the first monitored variable.

4. The method as recited in claim 1, wherein the first monitored variable comprises a computer system or network quantity.

5. The method as recited in claim 1, wherein the first portion of the reference shape comprises an upper portion of the reference shape, and the second portion of the reference shape comprises a lower portion of the reference shape.

6. The method as recited in claim 2, wherein said displaying the first icon further comprises positioning the first icon over a portion of the perimeter of the reference shape.

7. The method as recited in claim 1, wherein positions of the first icon when the present value is within the first higher-interest range and when the present value is within the first lower-interest range are laterally aligned, such that both positions are located along the same perpendicular to a horizontal line bisecting the reference shape.

8. The method as recited in claim 1, wherein said reference shape is substantially vertically symmetric about a horizontal line bisecting the reference shape.

9. The method as recited in claim 1, wherein said reference shape is substantially horizontally symmetric about a vertical line bisecting the reference shape.

10. The method as recited in claim 1, wherein said reference shape is an oval elongated in a horizontal direction.

11. The method as recited in claim 1, wherein the first icon exhibits greater contrast with respect to the display screen than does the first alternative status icon.

12. The method as recited in claim 1, wherein the first icon and first alternative status icon are positioned along the same perpendicular to a horizontal line bisecting the reference shape.

13. The method as recited in claim 1, further comprising displaying a second icon and a second alternative status icon on the display screen, such that the second icon and second alternative status icon are superimposed on the reference shape, wherein the second icon and second alternative status icon correspond to a present status and an alternative status of a second monitored variable, and wherein the second icon is positioned over the first portion of the reference shape and the second alternative status icon is positioned over the second portion of the reference shape when a present value of the second variable is within a second predetermined higher-interest-range, and wherein the second present status icon is positioned over the second portion of the reference shape and the second alternative status icon is positioned over the first portion of the reference shape when a present value of the second variable is within a second predetermined lower-interest range.

14. The method as recited in claim 13, wherein the second icon and second alternative status icons are laterally displaced from the first icon and first alternative status icon.

15. The method as recited in claim 1, further comprising displaying a second icon on the display screen such that the second icon is superimposed on the reference shape, wherein the second icon corresponds to the present value of a second monitored variable, and wherein the second icon is positioned over the first portion of the reference shape when a present value of the second variable is within a second predetermined higher-interest range, and the second icon is positioned over the second portion of the reference shape when the present value of the second variable is within a second predetermined lower-interest range.

16. A system for displaying information, said system comprising:
    a display screen;
    a display controller operably coupled to the display screen, wherein the display controller is adapted to display a reference shape on the display screen, and wherein the display controller is further adapted to display a present status icon and an alternative status icon corresponding to the present status and alternative status, respectively, of a monitored variable on the display screen, such that the present status icon and alternative status icon are superimposed on the reference shape, and the present status icon is positioned over a first portion of the reference shape when a present value of the monitored variable is within a predetermined higher-interest range and the alternative status icon is within a second portion of the reference shape, and the present status icon is superimposed over the second portion of the reference shape when the present value of the monitored variable is within a predetermined lower-interest range and the alternative status icon is within the first portion of the reference shape; and a storage medium operably coupled to the display controller, wherein the storage medium is adapted to store information relating to the predetermined higher-interest and lower-interest ranges.

17. The system as recited in claim 16, wherein the display screen is associated with a computational device.

18. The system as recited in claim 17, wherein the computational device comprises a computer, telephone or personal digital assistant.

19. The system as recited in claim 17, wherein the display screen, display controller and storage medium are associated with the same computational device.

20. The system as recited in claim 17, wherein the display controller and storage medium are associated with a first computational device, and the display screen is associated with a second computational device, such that the display controller and display screen are coupled using a remote transmission link.

21. The system as recited in claim 20, wherein the monitored variable characterizes a computer system or network quantity, the first computational device comprises a system administration console, and the second computational device comprises a portable device.

22. A computer-usable carrier medium, comprising:

first program instructions executable on a computational device for displaying a reference shape upon a display screen associated with the computational device;

second program instructions executable on the computational device for displaying a first present status icon upon the display screen such that the first present status icon is superimposed on the reference shape, wherein the first present status icon corresponds to the present status of a first monitored variable, and wherein the first present status icon is positioned over a first portion of the reference shape when a present value of the first variable is within a first predetermined higher-interest range, and the first present status icon is positioned over a second portion of the reference shape when the present value of the first variable is within a first predetermined lower-interest range; and third program instructions executable on the computational device for displaying a first alternative status icon upon the display screen such that the first alternative status icon is superimposed on the reference shape, wherein the first alternative status icon corresponds to an alternative status of the first monitored variable, and wherein the first alternative status icon is positioned over the first portion of the reference shape when the first present status icon is positioned over the second portion of the reference shape, and the first alternative status icon is positioned over the second portion of the reference shape when the first present status icon is positioned over the first portion of the reference shape.

23. The carrier medium as recited in claim 22, further comprising data relating to the first predetermined higher-interest and lower-interest ranges.

24. The carrier medium as recited in claim 22, further comprising fourth program instructions executable on the computational device for displaying a second present status icon on the display screen such that the second present status icon is superimposed on the reference shape, wherein the second present status icon corresponds to the present status of a second monitored variable, and wherein the second present status icon is positioned over the first portion of the reference shape when a present value of the second variable is within a second predetermined higher-interest range, and the second present status icon is positioned over the second portion of the reference shape when the present value of the second variable is within a second predetermined lower-interest range.

25. The carrier medium as recited in claim 24, wherein the second and fourth program instructions are further executable for displaying the second present status icon laterally displaced from the first present status icon.

26. The carrier medium as recited in claim 24, further comprising data relating to the first higher-interest and lower-interest ranges and the second higher-interest and lower-interest ranges.

27. The carrier medium as recited in claim 22, wherein the second and third program instructions are further executable for displaying the first present status icon to have greater contrast with respect to the display screen than does the first alternative status icon.

28. The carrier medium as recited in claim 22, wherein the second and third program instructions are further executable for positioning the first present status icon and the first alternative status icon along the same perpendicular to a horizontal line bisecting the reference shape.

* * * * *

UNITED STATES PATENT AND TRADEMARK OFFICE
CERTIFICATE OF CORRECTION

PATENT NO. : 6,661,434 B1
DATED : December 9, 2003
INVENTOR(S) : MacPhail

It is certified that error appears in the above-identified patent and that said Letters Patent is hereby corrected as shown below:

<u>Column 13,</u>
Line 42, please delete "over the second of" and substitute therefor -- over the first portion of --.
Line 45, please delete "portioned" and substitute therefor -- portion --.
Line 47, please delete "portioned" and substitute therefor -- portion --.
Line 48, please delete "correspond" and substitute therefor -- corresponds --.

Signed and Sealed this

Thirty-first Day of August, 2004

JON W. DUDAS
*Director of the United States Patent and Trademark Office*